Aug. 19, 1952     J. YOUNG     2,607,360
WATER-POWERED REEL FOR WASHING
Filed Feb. 1, 1951
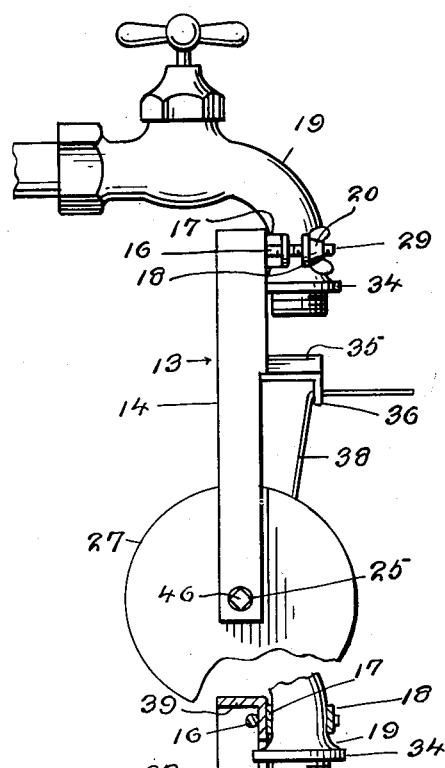
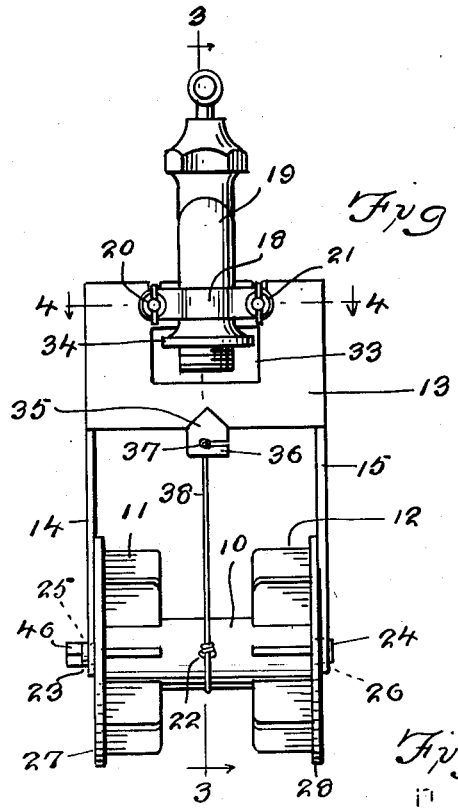
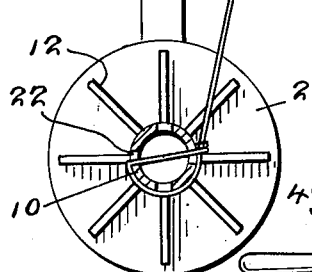
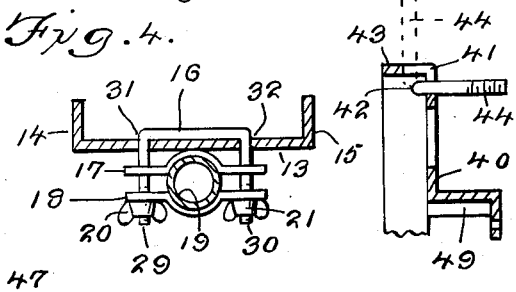
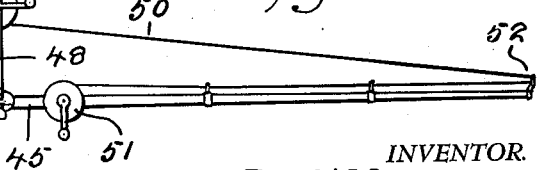
INVENTOR.
Jack Young
BY Victor J. Evans & Co.
ATTORNEYS Patented Aug. 19, 1952

2,607,360

UNITED STATES PATENT OFFICE 2,607,360

WATER-POWERED REEL FOR WASHING

Jack Young, Daytona Beach, Fla.

Application February 1, 1951, Serial No. 208,881

5 Claims. (Cl. 134—122)

1

This invention relates to devices for washing and cleaning lines and in particular a spool having fins thereon positioned so that water flowing over the spool rotates the spool, and means for attaching the spool to a water faucet with the fins positioned in the path of water flowing from the faucet.

The purpose of this invention is to provide means for washing a fishing line with water from a tap or faucet in which means is provided for winding the fishing line from a reel on a device positioned in the path of water flowing from the faucet.

Various types of racks have been provided for washing and drying fishing lines and with a fishing line reel positioned on one side of a faucet and a winding rack on the other it is possible to carry the line through the water of the faucet for washing but with the parts arranged in this manner it is difficult to hold and operate the reel, rack and faucet with two hands. With this thought in mind this invention contemplates a fishing line washing reel having means for attaching the reel to a faucet so that with the reel positioned in the path of water flowing from the faucet the water rotates the reel, winding the fishing line thereon and at the same time washing the line.

The object of this invention is, therefore, to provide means for forming a spool having water wheel fins on the ends thereof with a fishing line winding area intermediate of the ends, and means for mounting the reel on a water faucet so that the reel is actuated by water flowing from the faucet.

Another object of the invention is to provide a fishing line washing reel having means for attaching the reel to a faucet thereon in which the reel is adapted to be attached to faucets now in use without changing parts of the faucet.

A further object of the invention is to provide a fishing line washing reel with means for attaching the reel to a water faucet in which the complete device is a simple and economical construction.

With these and other objects and advantages in view the invention embodies a mounting base having a spool with radially disposed fins on the ends thereof journalled between extended arms of the base with means on the base for attaching the device to a water faucet and also for directing the water from the faucet toward the fins on the ends of the spool.

Other features and advantages of the invention will appear from the following description taken in connection with the drawing wherein:

2

Figure 1 is an end elevational view showing the fishing line washing reel illustrating the device in operative position upon a water faucet, and with part of the reel broken away.

Figure 2 is a front elevational view of the reel as shown in Fig. 1.

Figure 3 is a vertical section through the reel and mounting means being taken on line 3—3 of Fig. 2.

Figure 4 is a sectional plan through the mounting elements of the reel being taken on line 4—4 of Fig. 2.

Figure 5 is a cross section similar to that shown in Fig. 3 showing the upper end of the reel mounting frame and illustrating a modification wherein a bolt for clamping the device to a water faucet is mounted in elongated slots whereby the bolt may extend from the end of the frame for attaching the device to a fishing rod as illustrated in Fig. 6.

Figure 6 is a side elevational view on a comparatively small scale illustrating the modified form of the device as shown in Fig. 5 and showing the device mounted on a fishing rod.

Referring now to the drawing wherein like reference characters denote corresponding parts the fishing line washing reel of this invention includes a spool 10 having radially disposed fins 11 and 12 extended from the ends, a mounting frame 13 having extended arms 14 and 15 in the outer ends of which the spool is carried, and a clamp including a U-bolt 16 and clamping plates 17 and 18 which are secured in clamping relation with the neck of a faucet 19 by wing nuts 20 and 21.

The spool 10 is formed with a tubular core having line receiving slots 22 therethrough and the ends of the core are provided with extensions 23 and 24 that extend through openings 25 and 26, respectively in the ends of the arms 14 and 15. The ends of the spool are also provided with flanges 27 and 28 against which the fins 11 and 12, respectively are positioned, as shown in Fig. 2.

The arms 14 and 15 extend from a plate 13 providing a mounting base and the ends 29 and 30 of the U-bolt extend through openings 31 and 32, respectively in the upper part of the base whereby the clamping plates 17 and 18 positioned on the ends 29 and 30 may be clamped around the end or neck of a faucet 19 for securing the reel in position on the faucet, by the wing nuts 20 and 21. The plate 13 is also provided with an opening 33 that is positioned to receive a collar 34 of a faucet of the type having a hose receiving nipple on the end thereof.

The mounting plate 13 is also provided with a

V-shaped reflecting baffle 35 that is positioned directly below the faucet whereby water flowing from the faucet passes outwardly over the inclined surfaces of the baffle and strikes the fins 11 and 12 of the spool 10. The outer end of the baffle 35 is provided with a flange 36 and an opening 37 in the flange is positioned to receive a fishing line, as indicated by the numeral 38.

The upper end of the supporting device is provided with a flange 39 which extends from the edge of the plate 13 and connects the ends of the arms 14 and 15.

With the parts in position on a faucet as illustrated in Figs. 1 and 2 the fishing line from a reel is threaded through the opening 37 and attached to the spool 10 through the openings 22 of the core and as water flows from the faucet it strikes the fins 11 and 12 causing the spool 10 to rotate with the fishing line winding on the spool and at the same time being washed by water flowing from the faucet.

In the modification illustrated in Figs. 5 and 6 a mounting plate 40, similar to the plate 13 is provided with spaced slots 41 through which the ends of a U-bolt 42 extend and with the U-bolt mounted in slots extended upwardly to the upper edge of the plate 40 and also into a flange 43 at the upper edge of the plate the U-bolt may be extended upwardly as indicated by the dotted line 44, in Fig. 5, so that the reel may be clamped to the handle of a fishing rod 45 as shown in Fig. 6.

The spool 10, as illustrated in Fig. 2, may also be provided with an extension or shank 46 that is positioned on the pin or extension 23 and a crank 47 may be placed on the extension for rotating the reel by hand.

In the design illustrated in Figs. 5 and 6 the plate 40 forms part of the frame 48 and this frame may also be provided with a baffle 49, similar to the baffle 35.

With the device positioned on a fishing rod the fishing line 50 may extend from a reel 51, through an eye 52 at the outer end of the fishing rod, and from the eye to the spool or reel of the washing device. By this means the fishing line may be placed on the washing reel and may also be returned from the washing reel to the reel of the fishing rod with the line passing through the air for drying.

It will be understood that other modifications may be made in the design and arrangement of the parts without departing from the spirit of the invention.

What is claimed is:

1. A fishing line washing reel comprising a base having arms extended therefrom, a spool journalled in the arms, means on the base for clamping the device to a water faucet with the spool positioned in the path of water from the faucet, and means on the spool for rotating the spool by water passing thereover.

2. A fishing line washing reel comprising a base having arms extended therefrom, a spool having radially disposed fins on the ends thereof positioned between and journalled in the said arms, means on the base for clamping the device to a water faucet with the spool positioned in the path of water from the faucet, and means for directing water from the faucet to the fins on the ends of the spool.

3. A fishing line washing reel comprising a base having arms extended therefrom, a spool having radially disposed fins on the ends thereof positioned between and journalled in the said arms, means on the base for clamping the device to a water faucet with the spool positioned in the path of water from the faucet, and means for directing water from the faucet to the fins on the ends of the spool, said spool having line attaching means therein and said deflecting means having a line receiving opening in the outer end.

4. In a fishing line washing spool, the combination which comprises a base having openings therethrough and arms extended therefrom, said base also having a deflecting baffle mounted thereon, a spool having radially disposed fins positioned on the ends and line attaching means in the intermediate part thereof positioned between and journalled in the said arms, a U-bolt extended through openings in the base, clamping plates positioned on the ends of the said U-bolt, and wing nuts threaded on the ends of the bolts for securing the clamping plates in position on a water faucet.

5. In a fishing line washing reel, the combination which comprises a spool having a tubular core with line attaching openings therethrough, with flanges on the ends and with radially disposed fins positioned on the inner surfaces of the flanges, said flanges having centrally positioned pins extended from the outer surfaces, a base having arms extended therefrom with openings in the arms positioned to receive the pins from the outer surfaces of the flanges of the spool, a V-shaped deflecting baffle carried by the base and positioned midway between the arms thereof, and a mounting clamp adjustably positioned on the said base.

JACK YOUNG.

No references cited.